United States Patent [19]
Galbraith et al.

[11] Patent Number: 4,964,107
[45] Date of Patent: Oct. 16, 1990

[54] RELATIVE TIMING PRECOMPENSATION OF HIGH-SPEED PULSE SIGNALS FOR DIGITAL MAGNETIC RECODING

[75] Inventors: Richard L Galbraith; Raymond A. Richetta, both of Rochester; Timothy J. Schmerbeck, Kasson, all of Minn.

[73] Assignee: International Business Machines Corporation, Armonk, N.Y.

[21] Appl. No.: 493,188

[22] Filed: Mar. 14, 1990

[51] Int. Cl.⁵ ............................ G04F 8/00; G11B 5/09
[52] U.S. Cl. ....................................... 368/120; 360/51
[58] Field of Search ............................... 368/118–120; 360/39.40, 46, 51; 375/110, 111, 116, 119, 120

[56] References Cited
U.S. PATENT DOCUMENTS

| | | | |
|---|---|---|---|
| 4,607,296 | 8/1986 | Smidth | 360/51 |
| 4,719,523 | 1/1988 | Kutaragi | 360/51 |
| 4,811,125 | 3/1989 | Sengoku | 360/51 |
| 4,845,574 | 7/1989 | II et al. | 360/51 |
| 4,866,544 | 9/1989 | Hasaimoto | 360/40 |

*Primary Examiner*—Vit W. Miska
*Attorney, Agent, or Firm*—J. Michael Anglin

[57] ABSTRACT

A circuit for a partial-response, maximum likelihood (PRML) magnetic recording channel stretches and shrinks pulses in particular write-data sequences. The circuit maintains precise tracking in the delays among multiple signals by sending them through the same number of identical circuits on the same chip. An external digital code varies the amount of delay in a clock signal so as to stretch and shrink the data pulses by different amounts.

14 Claims, 9 Drawing Sheets

RELATIVE TIMING PRECOMPENSATION OF HIGH-SPEED PULSE SIGNALS FOR DIGITAL MAGNETIC RECODING

BACKGROUND OF THE INVENTION

The present invention relates to high-density magnetic recording of digital data, and more specifically concerns electronic circuits and methods for producing very accurate timing variations in the clocking of high-speed write data to be recorded upon magnetic media, so as to compensate for nonlinear properties of the media.

The magnetic recording art has long known that narrow pulses in certain patterns of digital data signals experience pulse compression and other nonlinear pulse-edge displacement effects when stored magnetically on a disk file. The resulting data read back from the disk has a hundred times higher error rate because the nonlinear edge timing shifts reduce the timing margin for error of the data detection system. If the pattern-dependent edge shifts can be ascertained for the particular medium, then it is possible to preshift the write data pulse edges by an amount equal and opposite to the direction in which the medium will shift them, so that data with the correct timing relationships will be read back from the disk. Such timing precompensation can decrease error rates enough to allow disk-file capacity gains as high as twenty percent. Particular algorithms for determining which pulse edges to shift are well known, and do not form a part of the present invention.

The amount of capacity improvement obtainable for any algorithm depends strongly upon the accuracy of the time shifts delivered by the precompensation circuit. The shifts are typically small, on the order of 1 nsec to 8 nsec: and the pulse frequencies are very high, about 27 MHz.

One conventional technique for obtaining time shifts and delays for this purpose is to use RC or other analog timing circuits. This technique is severely limited by component tolerances and environmental factors such as temperature.

Another technique relies upon propagation delays of logic gates to determine time intervals of pulse edge shifts. However logic-gate delays are inherently highly variable with environmental factors and process variations.

A third method is to synchronize all signals to a compensation clock operating at a frequency high enough to allow all precompensation intervals to be specified in integral numbers of cycles of the compensation clock. At current disk-drive speeds, such a clock would have to operate at 1 GHz. The logic gates, wiring, and shielding necessary for this frequency make this method impractical. (Although circuit technology might advance to such speeds, advances in recording technology will undoubtedly raise the speed requirement at a comparable pace.)

SUMMARY OF THE INVENTION

The present invention provides timing precompensation for a write-data signal in a digital magnetic recording device. The precompensation circuit has a greater accuracy at lower cost than previous circuits.

The invention achieves these and other advantages by transmitting all the signals which must be synchronized through the same circuits, but performing different operations upon the different signals. These signals include a write-clock pulse train, a write-data pulse train and a compensation indicator level. One of these circuits is a delay circuit whose delay interval is varied by a digital control signal so as to vary the write-clock pulse timing. Another circuit is a logic means for selecting between the delayed and undelayed write-clock signal in response to the compensation indicator signal. The overall circuit makes this selection in response to one or more patterns in successive pulses of the write-data signal.

DRAWINGS

DESCRIPTION OF A PREFERRED EMBODIMENT

Figure 1:
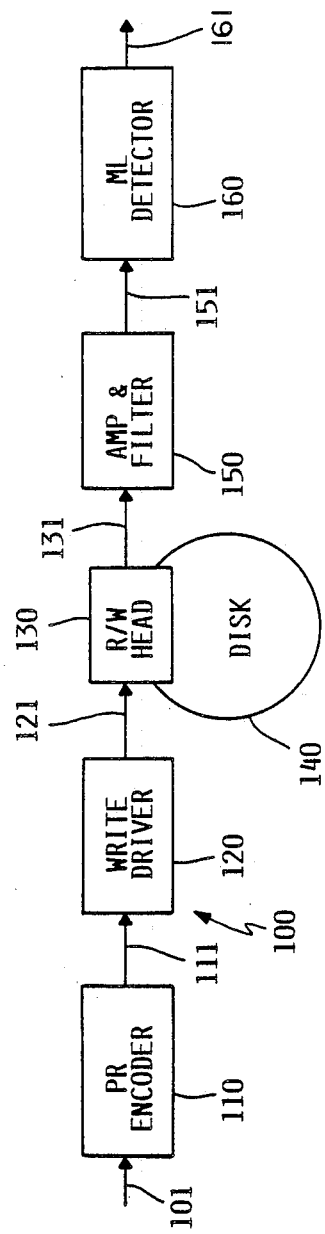
FIG. 1 shows a preferred environment for the present invention.

FIG. 1 is a high-level block diagram of a magnetic disk drive 100 using a Partial Response. Maximum Likelihood (PRML) channel for writing and reading digital data on the disk.

PRML. originally a communications coding technique, has been more recently adapted for recording data upon magnetic disks as an alternative to the more usual "peak-detecting" (PD) techniques such as frequency modulation (FM). Briefly. PRML uses a "partial response" coder such as block 110 to encode parallel NRZ (non return to zero) digital data 101 from a data processor or other source into a sequence of serial pulses on line 111. Whereas PD coding uses pulse sequences designed to produce a response at a single sample time for each individual pulse edge. PR coding produces sequences which yield responses at two adjacent sample times for a particular pulse edge.

A write driver 120 converts the pulse sequence 111 into a form having an amplitude and clocking suitable for read/write head 130 to record upon magnetic disk 140. Write driver 130 contains the circuits for clocking the pulses according to the present invention. Conventional means for actuating the head and spinning the disk are not shown. Line 131 sends a sequence of analog pulses read from the disk to module 150. This module amplifies and filters the serial pulses, then synchronizes them to a read clock and converts them to digital form on line 151. Finally, "maximum likelihood" (ML) detector 160 converts the raw digital pulses into a sequence of digital bits which are most likely to represent the original bits on line 101, and converts these bits into parallel form on output lines 161. The names "Viterbi detection," "trellis decoding," and "maximum likelihood sequence estimation" are also associated with ML decoding.

PRML channels for magnetic recording are described in: Kobayashi, "On Optimal Processing of Digital Magnetic Recording Data," IEEE Transactions on Magnetics, vol. MAG-7. p. 422 (Sept. 1971): Kobayashi and Tang. "New Coding Approach to Digital Magnetic Recording", id., pp. 422-423; Kobayashi and Tang, "Application of Partial-Response Channel Coding to Magnetic Recording Systems," IBM Journal of Research and Development, vol. 14, pp. 368-375 (June 1970): and Kobayashi. "Application of Probabilistic Decoding to Digital Magnetic Recording," id., vol. 15, pp. 64-74 (Jan. 1971). Specific PRML recording channels are described in U.S. Pat. Nos. 3,648,265 and 3,792,356 to Kobayashi and Tang.

Figure 2:
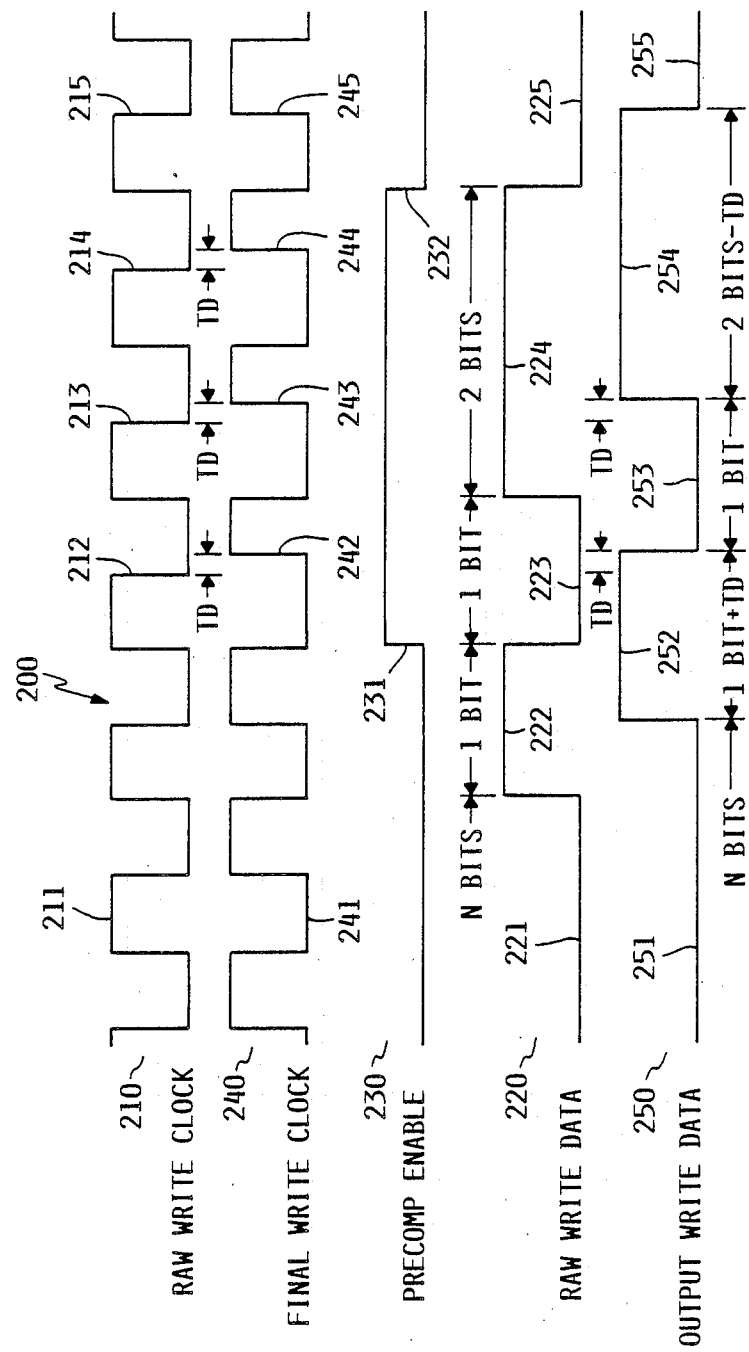
FIG. 2 is a timing diagram showing various signals pertaining to the invention.

FIG. 2 shows timing waveforms 200 for a typical sequence of write-data pulses on lines 111 and 121 of FIG. 1. PRML coding, having started life as a communications method, assumes a linear channel. However, the recording characteristics of a magnetic medium such as a disk are decidedly nonlinear. It is well known that writing a narrow pulse following a long pulse shrinks the narrow pulse, and writing a wide pulse following a narrow pulse stretches the wide pulse. Therefore, conventional write drivers vary the clocking of the write data so as to widen the narrow pulse and to narrow the wide pulse in such a sequence of write-data pulses.

Waveform 210 is a raw write-clock signal having a series of constant-width pulses such as 211. In a typical channel, these pulses might have a frequency of about 27 MHz. Waveform 220 is an example of a raw write-data signal having a wide low level 221 representing several consecutive 0 data bits, then a narrow high level 222 representing one 1 bit, then a narrow low level for a single 0 bit, then a wide high level 224 for several consecutive 1 bits, and finally a low level for several 0 bits. In an uncompensated channel, data 220 would be latched on the falling edge of each clock pulse 211, and gated to the head immediately. (In practice, changes in waveform 220 must follow changes in 210 by a small delay, such as 1nsec. This delay is not critical, as long as it is greater than zero.)

Narrow data pulse 222 follows a wide pulse 221, and must therefore be stretched. Precompensation-enable signal 230 indicates this sequence by a rising edge 231. Similarly, wide data pulse 224 follows a narrow pulse 223, and must be shrunk. Enable signal 230 indicates this condition by a falling edge 232.

Write-data stretching and shrinking is accomplished by retiming clock 210 as final clock 240 in response to the enable signal 230. (The polarity of clock pulses 241 are also inverted from those of clock pulses 211, purely for convenience.) Specifically, rising edge 231 delays the rising edge 242 of final clock 240 from the corresponding falling edge 212 of raw clock 210 by an amount TD. The following narrow pulse should not be stretched; delaying rising edges 242 and 243 by the same amount, TD, from the corresponding raw-clock edges 212 and 213 preserves this width unchanged. The following wide pulse 224, however, terminates enable signal 230 at 232. This removes the TD delay between clocks 210 and 240, so that the rising edge 245 of final clock 240 coincides with the corresponding falling edge 215 of raw clock 210.

Waveform 250 shows how final clock 240 retimes raw data 220 into a compensated final write-data signal. Again, rising edges of final clock 240 latch data 250 for transmission to the head for writing to the disk. Wide pulse 251 has the same duration as the corresponding raw-data pulse 221. The following narrow pulse begins at the normal time, but it does not fall until the delayed edge 242 of final clock 240; this widens it by a time interval TD. The next data pulse 253 is also a narrow pulse: since clock pulses 242 and 243 are both delayed by the same amount from their corresponding raw-clock pulses. The width of final-data pulse 253 has a normal duration—it is not shrunk. But the next wide pulse. 254, begins TD later than normal and ends on time, because the rising clock edge 245 is not delayed. Therefore, final data pulse 254 is shrunk by TD from its raw data pulse 224. The subsequent wide pulse 255 has a normal length. Although the optimum value of TD does not depend upon the write-data sequence it may vary with other factors, such as which of several different disk platters the data is to be written upon, and which track of the disk is to receive the data. The art knows how to adjust the value of TD for these and other factors.

The width of a typical clock pulse such as 211 is 18.5 nsec in this embodiment, and a typical values of TD might range from 1nsec to 8 nsec, in 1 nsec steps. On the other hand, the delay of a typical logic gate in a technology fast enough to be used in a write driver such as 120. FIG. 1, could be nominally 2 nsec., with a tolerance of plus or minus 50%. Thus, although the synchronization among the various signals 210-250 is shown as being very precise. The normal variations in circuit speed with process and environmental factors, different numbers of gates required to process each signal, and other variables would make an utter hash of this necessary synchronization. That is, all of the matching signal delays must track very closely. The data and clock path delays, from their inputs to the point where the final data is latched for transmission to the head, must match very closely in order to maintain proper phase relationships.

Likewise the delay of the precompensation enable input must match the delay of the circuit which accepts the value of the compensation signal TD. in order for the correct clock edges to be selected for delay. The delay in the paths of the raw and final clock paths must also track each other closely, so as to maintain the accuracy of the TD values. When the enable input is low, the paths must add no timing skew, shift or asymmetry to the data signal; this is important because the vast majority of data needs no stretching or shrinking.

Figure 3:
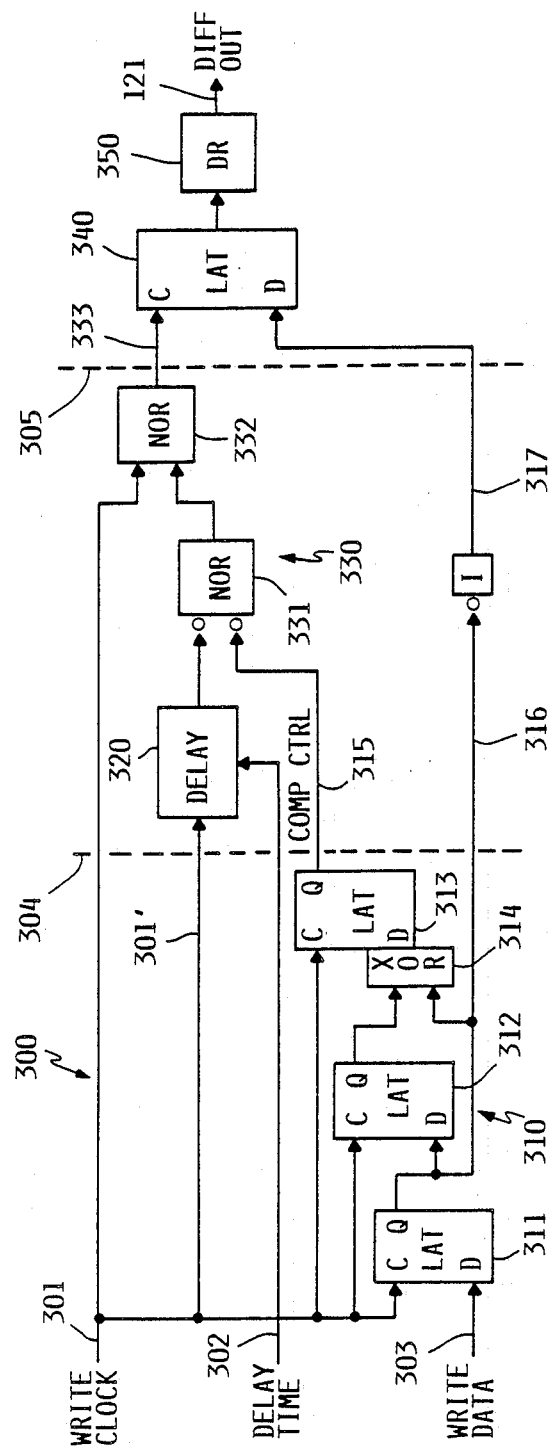
FIG. 3 is a high-level block diagram showing the logic of the write driver of FIG. 1.

FIG. 3 shows the logic 300 of write driver 120, FIG. 1. Raw write clock 301 is a fixed pulse sequence having waveform 210. FIG. 2: it may be produced by a conventional oscillator, not shown. Delay code 302 is a three-bit parallel digital signal specifying the magnitude of the delay to be selectively applied to raw clock 301. Write data 303 is a sequence of data bits to be recorded on the magnetic disk 140. FIG. 1.

Conventional level-sensitive latches 311-313 and XOR logic gate 314 form a sequence detector 310 for producing a compensation control signal on line 315 having the waveform shown as 230 in FIG. 2. The latches form a shift register clocked by write clock 301 at every bit time. Serial NRZ write-data pulses, conventionally derived from the parallel write data on lines 101 of FIG. 1, are sampled by latch 311 whenever clock 301 is high, and held unchanged while clock 301 is low. The XOR gate feeds a high level into latch 313 for every bit time in which the data has changed from the previous bit time. This produces the requisite rising edge when a narrow (i.e., single-bit length) pulse follows a wide (i.e., multi-bit length) pulse, maintains a high level as long as the narrow pulses continue, then produces a falling edge when a wide pulse follows a narrow pulse, and maintains the low level for subsequent wide pulses.

A programmable delay circuit 320 produces a delayed clock signal on line 321. The amount of the delay can be any of eight different values, depending upon the control code on three parallel lines 302. The control code is produced by conventional means, not shown for determining the proper amount of pulse-width change for the particular disk, track etc. being written to. This signal changes orders of magnitude more slowly than the write data and clock signals, so that its delay is not critical for the purposes of circuit 300.

NOR gates 331 and 332 constitute a switch 330 for selecting between the delayed clock on line 321 and the undelayed clock on line 301, so as to produce a final clock signal on line 333 having the waveform shown as 240 in FIG. 2. This final, compensated clock signal 20 clocks the raw write data on line 316 into conventional write-data latch 340. A differential output signal is amplified by driver 350 and output as a differential signal on line 121 to head 130, FIG. 1.

It is evident that a straightforward implementation of circuit 300 would produce serious synchronization difficulties among the various signals at the high speeds required for its contemplated environment. Although small timing variations to the left of dashed line 304 are not significant, compensation control signal 315 would arrive at NOR 331 ahead of the delayed clock on line 321. The undelayed clock on line 301 would arrive at NOR 332 out of sync with delayed clock 321, because clock 301 does not traverse a delay equivalent to that through NOR 331. The write data is even more seriously mistimed with respect to the final clock 333; it does not encounter delays equivalent to those of the clock passing through NORs 331 and 332, nor the minimum delay of unit 320. Thus, all signals must have the same time delay passing through the region between dashed lines 304 and 305.

Figure 4:
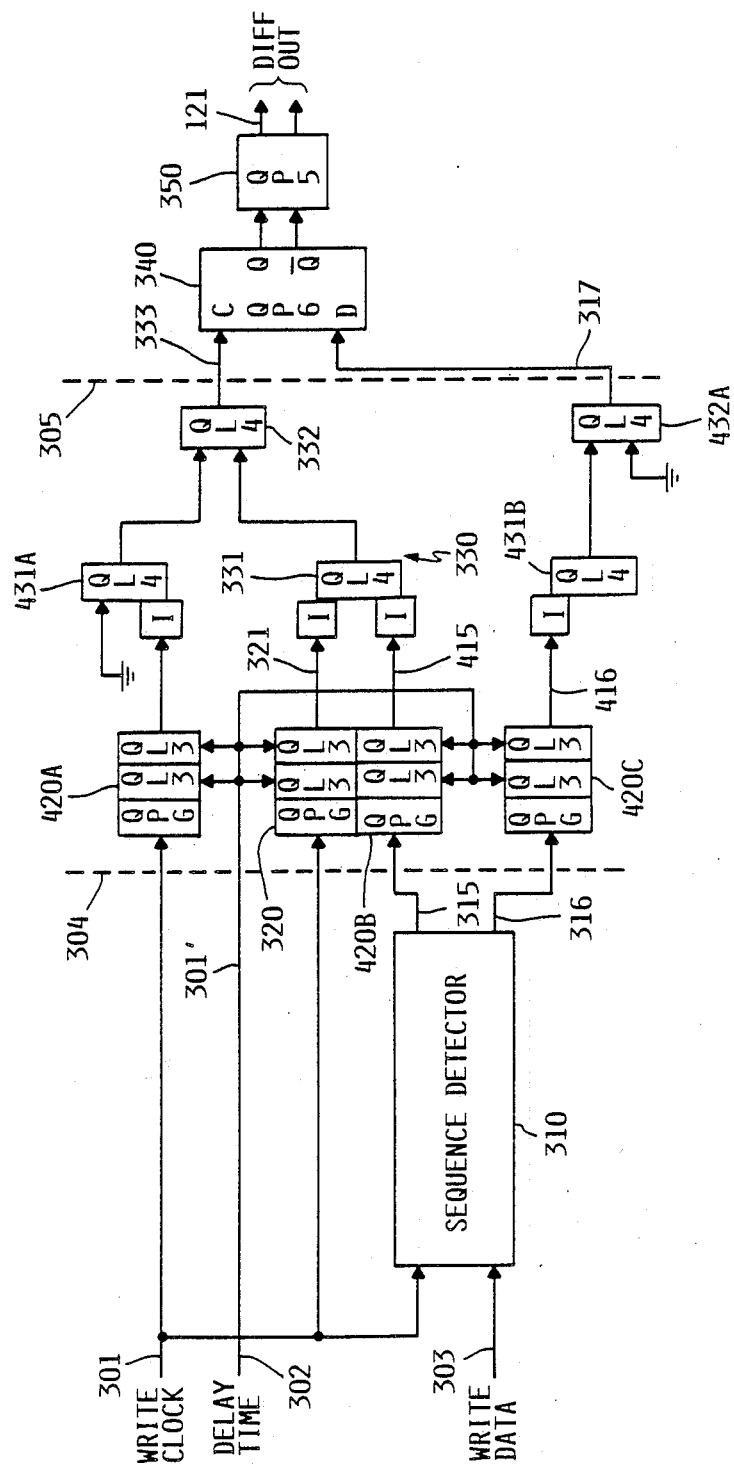
FIG. 4 is a more detailed diagram showing the implementation of the driver logic of FIG. 3 according to the present invention.

FIG. 4 shows an implementation of the logic of FIG. 3 as a circuit 400 in which the group delays of all of the high-speed signals track each other sufficiently in time to guarantee the relationships shown in the waveforms of FIG. 2, but at a very low cost in terms of chip space, and with no expensive precision parts or manual adjustments. The circuit not only can be implemented on a single integrated-circuit chip, it is preferably fabricated in this fashion, so that all delays through identical circuits track each other very precisely.

The three latches and the exclusive-or of sequence detector 310 are implemented in conventional single-ended CMOS circuits. The remainder of the circuitry is conventional differential ECL or cascade current switch technology. In the region between dashed lines 304 and 305, in which precise synchronization is required. The signals on lines 301, 301, 315, and 316 are all converted from single-ended CMOS levels to differential ECL levels by identical conventional converters QPG; all signals then remain in two-wire differential form to output 121.

All of these signals are next presented to identical variable delay units QL3. The first QL3 circuit in line 301, is coupled to the lines 302 carrying the three-bit control code so as to produce any one of eight different delay durations TD as specified by the code. The control inputs of all the remaining QL3 circuits always produce the minimum delay possible for that circuit. That is, a control code input of 000, produces exactly the same delay in all of the lines 301. 301 . 315 and 316: other control codes produce successively longer delays in line 301 than in the other three lines. A second QL3 delay circuit in each of the four lines also produces the same minimum delay through all four lines. Two cascaded delay units are required because the delay through a QL3 unit due to a rising edge is different than the delay due to a falling edge. Connecting two identical circuits in series, with the second taking the opposite polarity output from the first, makes the composite block delay for any input edge always the sum of a falling and rising circuit delay. Thus, the delay of block 320 is exactly matched by the delays of blocks 420A, 420B, and 420C in the other lines, except for the programmable added delay from control code 302. This configuration also improves the absolute accuracy of the programmable delay time by subtracting out parasitic effects. In FIG. 4. control-code lines 302 are shown connected to all of the QL3 delay circuits. However, as described in connection with FIG. 7, lines 302 only vary the delay of the first QL3 circuit in line 301; the remaining connections serve only to compensate for circuit capacitances which would otherwise degrade the accuracy of these circuits.

The differential nature of the ECL circuits permits an inversion to be obtained by simply changing which of the two outputs is considered to be the positive one. So the inverters I in FIG. 4 are merely outputs with connection wires swapped prior to passing the signal to the next differential gate. This is called a "wire inverter" it does not introduce any signal delay.

Gate 331 of switch 330 is a differential-input/differential-output ECLNOR gate QL4. The delay experienced by signal 315 and 321 in passing through this gate is also introduced into the raw write-clock and raw write-data signals by placing identical QL4 gates 431A and 431B in these paths; their remaining gates are hard-wired to a digital 0 level, so that they do not perform any other logic function—or, equivalently, all of the signals pass through identical QL4 circuits, but the functions performed upon different ones of the signals are different. Similarly. QL4 circuit 432A matches the delay of the raw write-data signal 316 to the delays of the outputs from gates 331 and 431A, so that the final clock signal 333 and the raw write-data signal 317 arrive at their respective inputs to latch 340 with precisely matched group delays. Latch 340 is a differential ECL level-sensitive latch of conventional design. Driver 350 is a conventional voltage-to-current differential driver circuit for converting the clocked and latched final write-data signal 121 to the magnetic head 130, FIG. 1.

FIGS. 5–9 are circuit diagrams of certain blocks in FIG. 4. In the diagrams, NPN bipolar transistors have base/emitter arrows pointing away from the body of the transistor. An open rectangle indicates an N-channel FET: a slash in the rectangle is a P-channel FET: and an X indicates a low-threshold N-channel FET. All of the circuits in FIGS. 5-9 are fabricated on a single integrated circuit chip, and in fact occupy only a small fraction of the total chip area.

Figure 5:
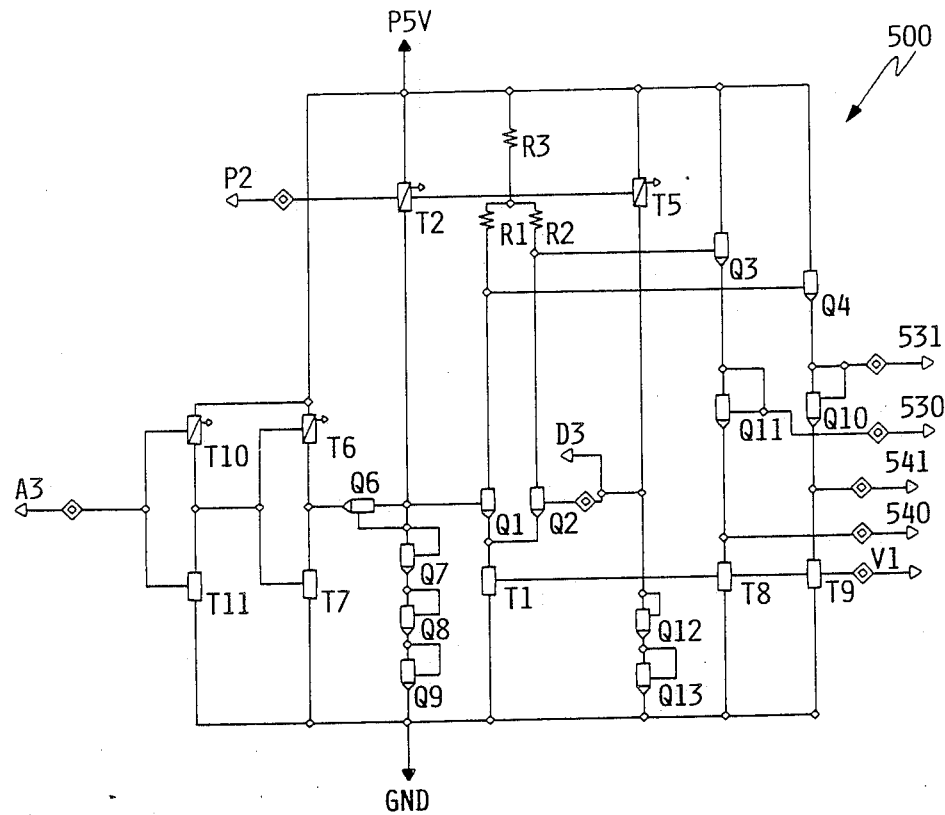
FIG. 5 shows the circuit of a converter used in FIG. 4.

FIG. 5 shows the circuit 500 of a conventional single-ended-CMOS to differential-ECL converter circuit QPG as used in FIG. 4. The CMOS input is at connector A3. A first differential output is at connectors 530 and 540, while a second differential output at 531 and 541 is shifted one diode drop lower in voltage. Connector D3 is maintained two diode drops above ground: connectors P2 and V1 are bias voltages P5V is a supply voltage: GND is a ground potential.

Figure 6:
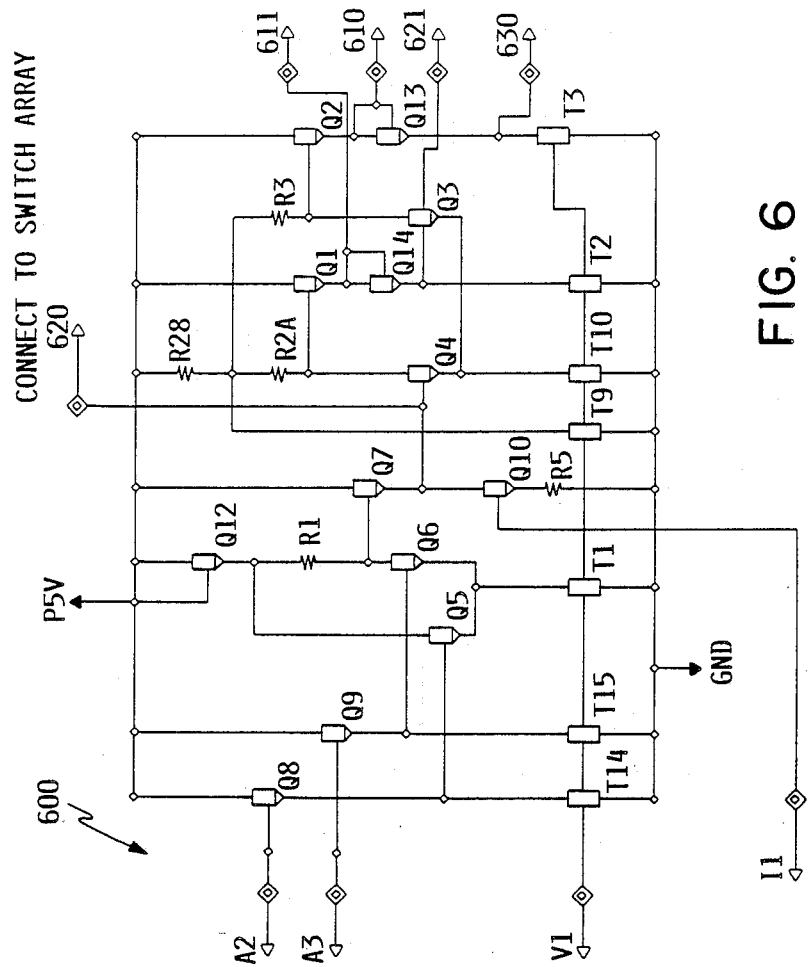
FIG. 6 shows the circuit of a delay unit of FIG. 4.

FIG. 6 shows the circuit 600 of a novel programmable time delay circuit QL3 as used in FIG. 4. Connectors A2 and A3 form a differential input for the timer circuit. Connector 620 is coupled to a switched capacitor array shown in FIG. 7. The two differential outputs are 610 to 630 and 611 to 621; the latter output is at one diode drop lower voltage than the former. Connectors V1 and I1 are coupled to a reference voltage and current from terminals V1 and I1 in FIG. 8. The input signal causes switching action at the differential pair Q5 and Q6.

The falling edge of the raw clock input 210 is the edge to be delayed, since this edge ultimately causes the data latch 340 to pass the write data 317 to head 130. The falling edge of the input signal causes connector A2 to fall and A3 to rise, so that transistor Q6 turns on and Q5 turns off. The base of Q7 is pulled lower by about 1.5 volts. Connector 620 couples to one of the terminals C1-C8 in FIG. 7. Since the emitter of Q7 is fixed by the capacitance—either desired or parasitic—on connector 620, transistor Q7 turns off with its base/emitter junction reverse-biased. Current source Q10 discharges the capacitance at connector 620, pulling the connector 620 voltage down. At the start of the discharge cycle Schmitt trigger differential pair Q4 and Q3 are switched such that Q4 is on and Q3 is off, so that the differential outputs are high. The initial voltage at connector 620 is two diodes below the +5V power-supply level. Connector 21 is at two diodes below +5V. plus an additional drop which is approximately the current from current source T10 dropped across resistors R2A and R2B plus the drop of the current through transistor Tg across R2B. R2B is made exactly equal to R2A/3 by using three resistors having the same size as R2A in parallel. (R2A+R2B will be referred to as R2, and the total voltage drop across them will be referred to as VR2.) When connector 620 is discharged by a voltage equivalent to this start voltage across R2. The timer outputs 610 and 630 switch low. Feedback of the collector signal of Q4 to the base of Q3 through two level shift devices Q1 and Q14 provides a Schmitt trigger action.

The amount of added stage delay from falling input to falling output is given by the relationship Delay=C20*VR2/IQ10. C20 is the effective capacitance at connector 620. VR2 is the voltage across R2 when Q4 is on and conducting all of the current from current source T10, and IQ10 is the collector current of current source Q10. Variation in the delay depends upon the tolerance of these three terms. As described in connection with FIG. 8, the reference generator circuit is specially designed so that the tolerances of the voltage across R2 and the current through Q10 track together. The capacitance tolerance of conventional on-chip capacitors at connector 620 is small, typically 8%. Thus, the delay due to parasitic circuit capacitance—including switch capacitance—at connector 620 is the same for all of the QL3 circuits, and therefore drops out of the programmable delay TD shown in FIG. 2.

When the input clock edge rises again, Q5 turns on and Q6 turns off. The base of Q7 rises 1.5 volts and transistor Q7 turns on rapidly to charge node 620 back to its high level of two diode drops below the five volt supply P5V. The differential output pairs now switch high. The current delivered by Q7 to charge connector 620 is limited only by the devices internal resistance and the resistor R1. In this case, no additional resistance had to be added in series with the Q7 emitter to limit charging currents to non-damaging levels for Q7.

The rise time at connector 620 is much longer for the variable delay circuit QL3 in line 301 than for the other, fixed-delay QL3 circuits, because of the capacitors selected by the control code. This does not affect the arrival time of final clock 333 at latch 340, FIGS. 3 and 4, because the falling edge—the edge which opens latch 340 to the data signal—is gated by the earlier of the two inputs to NOR 332. That is, whichever output of NOR 332 switches off earlier produces the falling edge in signal 333.

The charging of connector 620 turns on Q4 and turns off Q3 to switch the output to the alternate state. The delay of this block is much smaller when connector 620 is rising than when connector 620 is falling because of the high charging current provided by Q7 when node 620 is rising. This is unacceptable for use in the data path since the delay due to rising data edges should be exactly the same as that for falling data edges. To assure symmetry between the rising and falling edges, two delay circuits 600 are connected in series, with the second circuit taking the inverted output of the first, as shown by blocks QL3 in FIG. 4. In this way, every data edge is delayed by the sum of a falling and rising delay in circuit 600.

Figure 7:
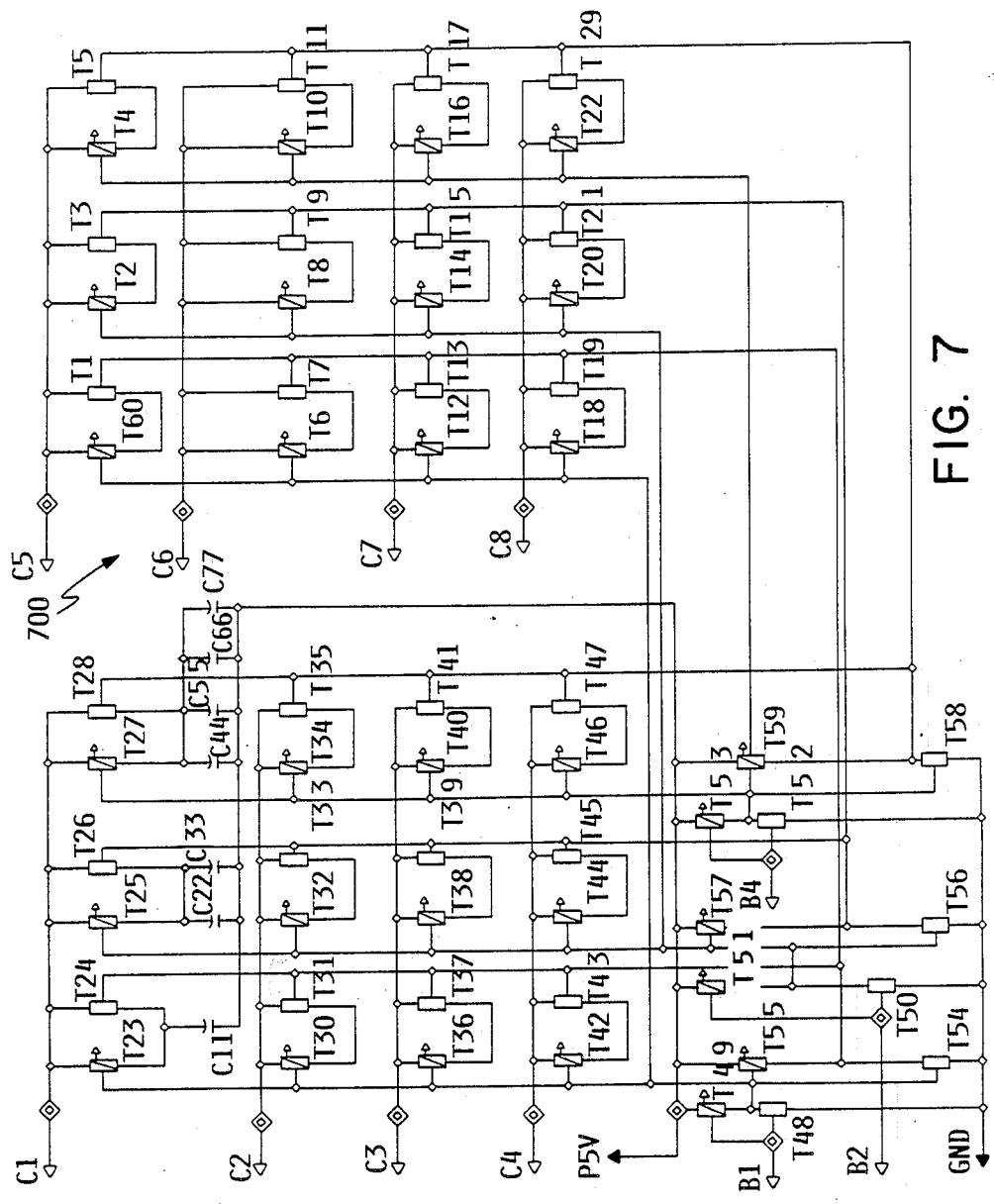
FIG. 7 shows an array of timing elements for the delay units of FIG. 6.

FIG. 7 shows an array 700 of matching switches used in all the delay circuits 600 for delay units QL3. Eight switch banks are required for the eight QL3 circuits in FIG. 4. Only one switch bank actually has capacitors physically present. Connectors B1, B2, and B4 receive the three-bit control code on line 302. FIG. 4. Connectors C1 thru C8 connect to the respective connector 620 of the eight QL3 circuits in FIG. 4. Connector C1 ties to connector 620 of the variable delay circuit in delay block 320 which actually varies its time delay in response to the control code on lines 302; terminals C2-C8 feed the connectors 620 of the remaining delay units.

CMOS bidirectional transmission gates are used to switch in binary-weighted on-chip capacitors C11-C77. The switches must be quite large to keep their channel resistance small, because the DC voltage drop across them due to IQ10 is a large term in the time-delay tolerance relation. But the inherent parasitic capacitance of a large switch leads to a large tolerance increase in the effective capacitance at connector 620, because the capacitances of the switches themselves can be a significant fraction of the capacitance of the on-chip capacitors. Moreover, the switches capacitance is different when the switches are on than it is when they are off.

These problems are overcome by placing identical large switches on the all of the QL3 delay circuits in FIG. 4: these switches are dummies, having no actual on-chip capacitors connected. This configuration effectively subtracts out the parasitic switch capacitance for every possible control code on lines 302. (The individual bit lines carrying the control code are B1, B2, and B4 in FIG. 7; FETs T48 through T59 form a driver for converting these bit signals into signals for operating the transmission gates or switches.) This also tracks out the capacitive tolerance errors on connector 620 from the inherent capacitance of devices Q7, Q4, and Q10. Thus, only the additional delay of the QL3 circuit whose terminal 620 is tied to connector C1 in FIG. 7 contributes to shifting the write-clock edge, and therefore to the final write-data edge shifts.

A high voltage on line B1 closes switches T23 and T24, connecting capacitor C11 to connector C1 and therefore to connector 620 of the variable delay circuit in unit 320. The switches T30, T31, T36, T37, T42, T43, T60, T1, T6, T7, T12, T13, T18, and T19 for the seven other timer circuits also close so as to track the difference in parasitic load between open and closed switches. Likewise, a high level on line B2 closes switches T25 and T26, connecting capacitors C22 and C33 to connector C1. The seven other corresponding switch pairs also close Line B2 corresponds to the second-order bit, and thus has two capacitors instead of the single capacitor for the low-order bit line B1. A high level on line B4 closes switches T27 and T28, to couple capacitors C44, C55, C66, and C77 to connector C1. Again, the seven other corresponding switch pairs also close. Line B4 corresponds to the high-order control code bit, and therefore has four capacitors.

Figure 8:
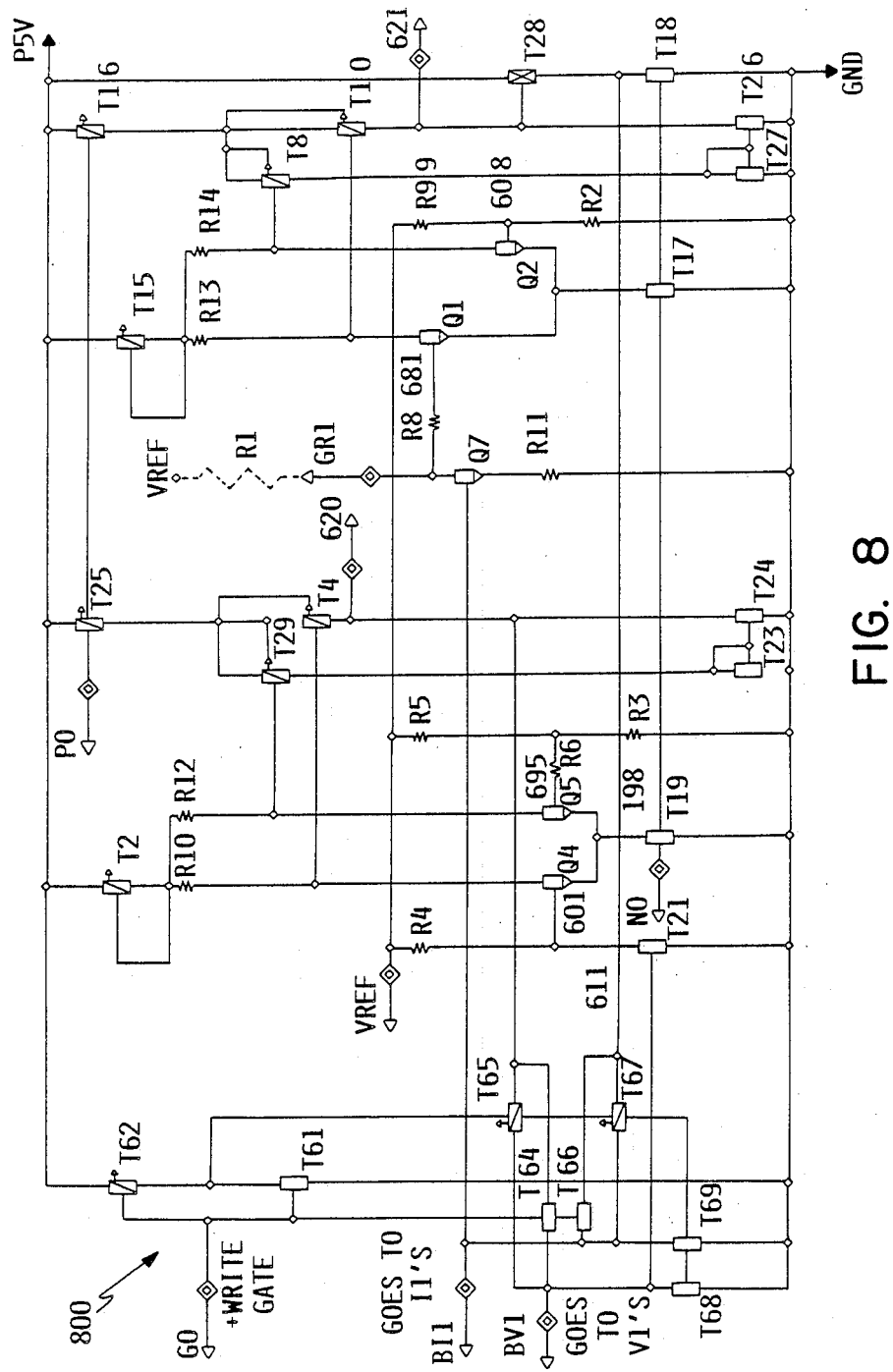
FIG. 8 shows the bias circuit for the delay units of FIG. 6.

FIG. 8 shows the bias circuit 800 used to produce the bias references for delay circuit 600. FIG. 6. Circuit 800 can be switched off to save power dissipation when the circuit 400 is not being used; connector G0 receives a conventional "write gate" signal which disables all reference signals when it is low. Connector I1 outputs a reference current to connector I1 of FIG. 6, and connector V1 sends a reference voltage to V1, FIG. 6.

When connector G0 is low, switches T64 thru T67 are open and devices T68 and T69 are on, pulling connectors I1 and V1 to ground potential. When connector G0 is high. T64 through T67 are on and T68 and T69 are off: this allows the signal present at nodes 820 and 811 to be passed on to connectors V1 and I1 respectively. Connectors PO and NO are conventional PFET and NFET current-source bias voltages. Connector VREF is a fixed 2.25 Volt bias voltage. Connectors 820 and 821 are conventional roll-off points for amplifiers. Nodes 895 and 801 form the inverting and noninverting inputs of an operational amplifier. The output of the amplifier is the gate of T21, which is also connector V1. Since the noninverting input is fixed at two thirds of the VREF voltage, negative feedback forces node 801 to the same voltage. This fixes the drop across R4 to be one third of VREF. The op-amp varies the gate drive of T21 to maintain this fixed voltage across R4. This gate drive signal point of T21 is the V1 reference mentioned previously at connector V1. It drives the gate of T10 in all of the delay circuits 600. FIG. 6 to produce a precise voltage across R2 for an accurate time delay. T21 in reference circuit 800 is of identical geometry to T9 and T10 in the delay circuit 600. The voltage across R2 in circuit 600 becomes simply (VREF*R2)/(3*R4), where R2 is in the delay circuit and R4 is in the reference circuit. Since R2 and R4 have identical value and geometry on the same chip, this term reduces to precisely VREF/3.

Nodes 881 and 808 form the inverting and noninverting inputs of an operational amplifier whose output is the collector of Q7. An external precision resistor R1 (shown in dotted lines) is connected from the collector of Q7 (connector GR1) to VREF. Since the noninverting input is fixed at two thirds of the VREF voltage, negative feedback forces connector GR1 to the same voltage. This constrains the drop across the external resistor to be VREF/3. The op-amp will vary the base drive of Q7 to maintain this fixed voltage across the external resistor R1. Since the external resistor can be of much tighter tolerance and lower temperature coefficient than an on-chip resistor, the collector current of Q7 has an accurate value with very small temperature coefficient. This base-drive signal point of Q7 is the I1 current reference at connector BI1. It drives the base of Q10 in all of the delay circuits 600 to produce an accurate discharge current across the capacitor array 700 at connector 620 of the delay circuit, to provide a very accurate time delay. Q7 and R11 in the reference circuit 800 are of identical geometry to Q10 and R5 respectively in the delay circuit 600. The collector current of Q10 in circuit 600 becomes VREF/(3*R1). The previous expression for the programmable time delay TD now reduces to TD=1.5*C20*R1. That is, the time delay accuracy depends only upon the capacitor value and the external resistor value, both of which can be made very accurate.

Figure 9:
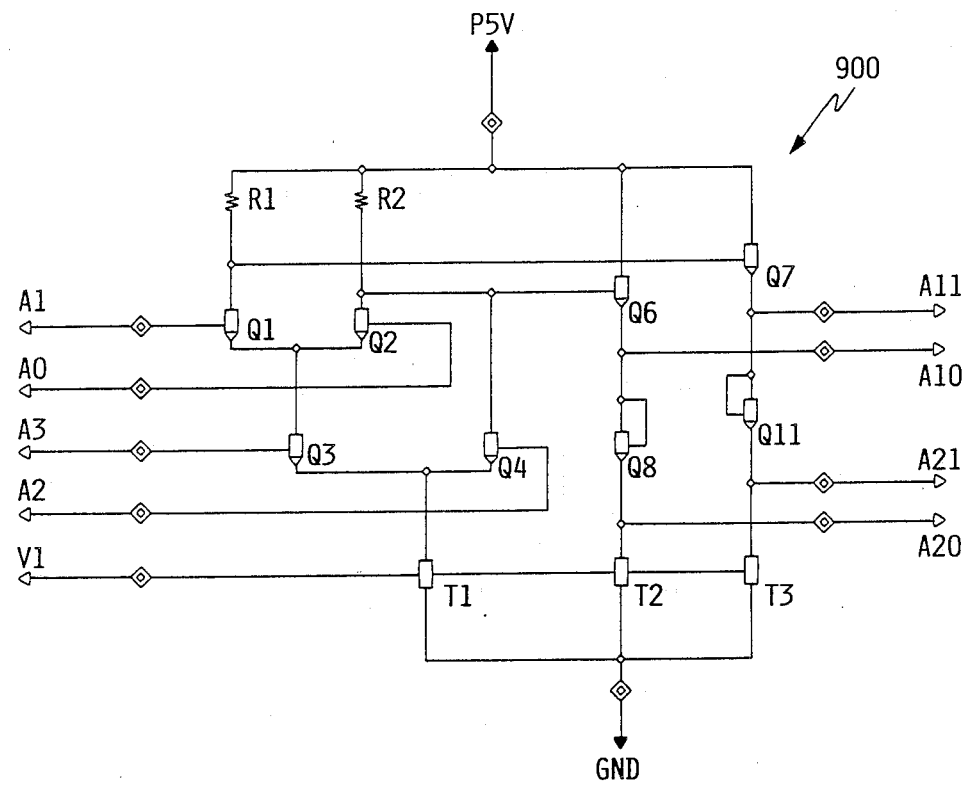
FIG. 9 shows the circuit of a NOR gate of FIG. 4.

FIG. 9 is a circuit 900 for a conventional ECL two-input differential NOR gate, shown as QL4 in FIG. 4. Connectors A1 and A0 form the first differential input while A3 and A2 form the second. V1 is a bias voltage. Connectors A11 and A21 constitute a high-level differential output: A10 and A20 form a differential output shifted one diode drop lower.

In summary, the embodiment described is well suited for integration since its accuracy depends upon the easily achievable matching of resistor ratios identical-geometry devices. Differential ECL implementation allows operation at high speeds with very low signal asymmetry. Data symmetry depends only upon the edge-to-edge symmetry of one edge of the clock and the extremely small skew of the differential ECL latch 340 and differential current driver 350. The scale factor of the time delay can be changed simply by changing the value of a single external resistor R1, FIG. 8. The on-chip timing capacitor allows a much smaller capacitor to be employed than if an external capacitor were used, by eliminating package parasitics. The smaller capacitor allows operation at much lower power for the timer discharge current. No chip I/0 pins are required, except for signal input and output and one external resistor, R1.

We claim as our invention:

1. A timing-compensation circuit for a high-speed magnetic recording device, comprising:
    an input for a raw clock pulse signal:
    an input for a raw data pulse signal:
    an input for a delay-code digital signal;
    a sequence detector responsive to a predetermined pattern of pulses in said raw data signal for producing a compensation signal;
    a set of at least three identical delay units, a first and a second of said delay units coupled to said raw clock signal, and a third of said units coupled to said raw data signal, said second delay unit being further responsive to said delay-code signal for producing a compensated clock signal having a time delay differing from those of said first and second delay units:
    gating logic coupled to said set of delay units for producing a final clock signal corresponding to either said raw clock signal or said compensated clock signal in response to said compensation signal:
    a latch for producing a final data pulse signal in response to said raw data signal and timed in response to said final clock signal.

2. The circuit of claim 1, wherein said set of identical delay units includes a fourth unit for delaying said compensation signal by an amount equal to that of said first and second units.

3. The circuit of claim 1, wherein said gating logic includes a first logic gate for combining two signals from said set of delay units, and a second logic gate for passing another signal from said set of delay units unchanged except for a delay equal to that of said two signals.

4. The circuit of claim 3, wherein said gating logic further includes a third gate coupled to said first and second gates for producing said final clock signal.

5. The circuit of claim 1, wherein each of said identical delay units in said set comprises a pair of identical delay circuits in series.

6. The circuit of claim 5, wherein each pair of said delay circuits is connected such that the time delay of a rising signal edge is equal to the time delay of a falling signal edge through said pair.

7. The circuit of claim 5, wherein only one of said delay circuits in that pair which comprises said second delay unit changes its time delay in response to said delay code signal.

8. The circuit of claim 1, wherein said set of delay units comprises:
 a set of individual delay circuits each receiving one signal to be delayed and a reference quantity:
 a single reference generator for producing said reference quantity for all of said delay circuits:
 an array of switches coupled to each of said delay circuits and responsive to said delay code signal.

9. The circuit of claim 8, wherein said array of switches comprises:
 a set of switches for each of said individual delay circuits, each of said sets being coupled to said delay code signal;
 a plurality of capacitors for determining a delay time in response to said delay-code signal, said capacitors being coupled to less than all of said sets of switches.

10. The circuit of claim 8, wherein said delay unit includes a pair of resistors fabricated on a single integrated-circuit chip. a single resistor external to said chip, and a set of capacitors, and wherein the delay time of said delay unit depends substantially entirely upon a ratio between the resistors of said pair, the value of said single resistor, and at least one capacitor of said set.

11. A method for applying precise timing variations to a high-speed pulsed data signal in response to a predetermined pattern occurring therein comprising:
 generating a clock signal
 detecting said predetermined pattern and producing a digital compensation signal therefrom:
 receiving a digital control signal having a plurality of discrete values;
 delaying said clock signal by an amount specified by said digital control signal value so as to produce a variable-delay clock signal;
 delaying said clock signal by an amount representing a fixed one of said digital control signal values so as to produce a fixed-delay clock signal;
 delaying said data signal by an amount representing a fixed one of said digital control signal values;
 delaying said compensation signal by an amount representing a fixed one of said digital control signal values;
 selecting either said fixed-delay clock signal or said variable-delay clock signal as a final clock signal;
 latching said fixed-delay data signal in response to said final clock signal so as to produce a clocked data signal.

12. The method of claim 11, comprising the further step of writing said clocked data signal on a magnetic medium.

13. The method of claim 11, wherein all of said delaying steps comprise transmitting their respective signals simultaneously through a set of identical delay circuits.

14. The method of claim 13, comprising the step of varying the delay time of one of said delay circuits in response to said digital control signal, so as to add a further delay to said variable-delay clock signal.

* * * * *

UNITED STATES PATENT AND TRADEMARK OFFICE
CERTIFICATE OF CORRECTION

PATENT NO. : 4,964,107

DATED : October 16, 1990

INVENTOR(S) : Galbraith, et al

It is certified that error appears in the above-identified patent and that said Letters Patent is hereby corrected as shown below:

ON THE TITLE PAGE ITEM [54] AND IN COLUMN 1, LINES 1-4,

THE TITLE IS INCORRECT AND SHOULD READ AS FOLLOWS:

RELATIVE TIMING PRECOMPENSATION OF HIGH-SPEED PULSE SIGNALS FOR DIGITAL MAGNETIC RECORDING

Signed and Sealed this

Fourth Day of February, 1992

Attest:

HARRY F. MANBECK, JR.

*Attesting Officer*              *Commissioner of Patents and Trademarks*